United States Patent
Knöös

(10) Patent No.: US 11,248,343 B2
(45) Date of Patent: Feb. 15, 2022

(54) OXYGEN BARRIER FILM

(71) Applicant: Stora Enso OYJ, Helsinki (FI)

(72) Inventor: Isabel Knöös, Säffle (SE)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 16/755,387

(22) PCT Filed: Oct. 9, 2018

(86) PCT No.: PCT/IB2018/057800
§ 371 (c)(1),
(2) Date: Apr. 10, 2020

(87) PCT Pub. No.: WO2019/073370
PCT Pub. Date: Apr. 18, 2019

(65) Prior Publication Data
US 2021/0207324 A1    Jul. 8, 2021

(30) Foreign Application Priority Data

Oct. 11, 2017 (SE) .................................... 1751258-3

(51) Int. Cl.
*D21H 11/18* (2006.01)
*D21C 5/00* (2006.01)
*D21H 27/10* (2006.01)

(52) U.S. Cl.
CPC ............. *D21H 11/18* (2013.01); *D21C 5/005* (2013.01); *D21H 27/10* (2013.01)

(58) Field of Classification Search
USPC ...................................................... 162/157.6
See application file for complete search history.

(56) References Cited

U.S. PATENT DOCUMENTS

| | | | | |
|---|---|---|---|---|
| 2012/0298319 A1* | 11/2012 | Fujiwara | ................ | D21H 11/18 162/100 |
| 2013/0280545 A1 | 10/2013 | Husband et al. | | |
| 2014/0255688 A1* | 9/2014 | Salminen | ................. | B32B 5/02 428/339 |
| 2015/0225590 A1* | 8/2015 | Iotti | ....................... | D21H 19/12 428/535 |
| 2020/0023409 A1* | 1/2020 | Axrup | .................... | D21H 25/14 |
| 2020/0239652 A1* | 7/2020 | Saukkonen | ............ | D21H 17/05 |

FOREIGN PATENT DOCUMENTS

| | | |
|---|---|---|
| EP | 2371892 A1 | 10/2011 |
| EP | 2548918 A1 | 1/2013 |
| JP | 2014095008 A | 5/2014 |
| WO | 2016067180 A1 | 5/2016 |
| WO | 2017046749 A1 | 3/2017 |
| WO | 2017046754 A1 | 3/2017 |
| WO | 2017221137 A1 | 12/2017 |
| WO | 2018138702 A1 | 8/2018 |

OTHER PUBLICATIONS

International Searching Authority, International Search Report, PCT/IB2018/057800, dated Dec. 13, 2018.
Cavaco-Paulo, A., and L. Almeida. "Cellulase Hydrolysis of Cotton Cellulose: The Effects of Mechanical Action, Enzyme Concentration and Dyed Substrates." Biocatalysis, vol. 10, No. 1-4, 1994, pp. 353-360., doi:10.3109/10242429409065244.
Iwamoto, S., et al. "Nano-Fibrillation of Pulp Fibers for the Processing of Transparent Nanocomposites." Applied Physics A, vol. 89, No. 2, 2007, pp. 461-466., doi:10.1007/s00339-007-4175-6.

* cited by examiner

*Primary Examiner* — Mark Halpern
(74) *Attorney, Agent, or Firm* — Greer, Burn & Crain, Ltd.

(57) ABSTRACT

The present invention relates to a process for improving the strechability of films comprising high amounts of microfibrillated cellulose (MFC) without negatively impacting the oxygen barrier properties. According to the present invention, a film is formed from a suspension comprising microfibrillated cellulose having a broad size distribution.

13 Claims, 1 Drawing Sheet

OXYGEN BARRIER FILM

This application is a U.S. National Stage under 35 U.S.C. § 371 of International Application No. PCT/IB2018/057800 filed Oct. 9, 2018, which claims priority to Swedish Patent Application No.1751258-3, filed Oct. 11, 2017.

The present invention relates to a method of manufacturing an oxygen barrier film. The invention further covers films made by the method and uses thereof.

BACKGROUND OF THE INVENTION

An effective gas and/or aroma barrier and particularly oxygen barrier is required in packaging industry for shielding products that are oxygen-sensitive, thereby extending their shelf-life. These include many food products, in particular, but also pharmaceutical products and in electronic industry products. Known packaging materials with oxygen barrier properties may be comprised of one or several polymer films or of a fibrous paper or board coated with one or several layers of an oxygen barrier polymer, usually as part of a multilayer coating structure.

More recently, microfibrillated cellulose (MFC) films, in which defibrillated cellulosic fibrils have been suspended e.g. in water, re-organized and re-bonded together to form a film with good gas barrier properties, have been developed.

Such films may be made by applying an MFC suspension on a porous substrate forming a web followed by dewatering of the web by draining water through the substrate for forming the film. This can be accomplished e.g. by use of a paper- or paperboard machine type of process. US2012298319A teaches a method of manufacturing of an MFC film by applying a furnish comprising MFC directly on porous substrate thus allowing the MFC to be dewatered and filtered.

Alternatively, the film can be made by use of casting technologies, including applying an MFC dispersion onto a non-porous cast substrate, such as a polymeric or metal substrate, and drying said film by evaporation. Films made by casting technologies usually provide a more uniform thickness distribution and a smoother surface. The publication EP2771390 A4 describes preparation of MFC films, in which an aqueous cellulose nanofiber dispersion is coated on a paper or polymeric substrate, dried and finally peeled off as a nanofiber film sheet.

Films made from MFC may however be brittle and provide low strain ability and tear resistance, since the short fibers will not have the ability to stretch in the same way as e.g. paper. In the art, it has been suggested to use additives, such as plasticizers to improve the stretchability. However, there is a need to limit the amount of plasticizers, especially in films to be used in connection with food packages, in order to comply with stipulated laws and regulations. Moreover, a high amount of plasticizers may deteriorate the mechanical and barrier properties of the film.

SUMMARY OF THE INVENTION

It is an object of the present disclosure to enable the manufacturing of thin oxygen barrier films, comprising a high amount of microfibrillated cellulose, with improved stretchability and with higher and/or maintained barrier properties compared to the films of the prior art.

These objects, and further advantages, are wholly or partially achieved by the suggested method, the film and the use thereof according to the appended independent claims. Embodiments are set forth in the appended dependent claims, and in the following description.

It has surprisingly been shown that an MFC film formed from a suspension having a broad size distribution exhibits a higher strain at break and maintained oxygen barrier properties compared to an MFC film formed from either a finer MFC or a coarser MFC.

According to a first aspect, there is provided a method of manufacturing an oxygen barrier film comprising the steps of:
  providing an MFC suspension comprising at least 75 weight % microfibrillated cellulose (MFC), as calculated on the total solid content of said suspension, which MFC has a particle size distribution based on volume exhibiting a D50 value of between 25-40 µm, a D10 value of 5-15 µm and a D90 value of between 90-120 µm,
  forming a web of said MFC suspension,
  dewatering and/or drying said web to form a film.

At the optimal mixture of coarser MFC and finer MFC according to the invention, the coarser fibers provides a higher strain at break while the shorter/finer fibers form a network which provide the high barrier levels. The invention further enables an MFC film with required stretchability to be formed with only a limited amount of additives. Especially, the invention enables use of little or no addition of plasticizers. Thus, the film may be free from plasticizers.

Preferably, the MFC suspension is free from long fibers. Long fibers as used herein means fibers from a less refined pulp, having a length weighted average fiber length of >0.8 mm. The high strength properties of the film achieved by the method of the invention enables the use of MFC as the only fiber source—thus avoiding the use of long fibers. In this way, the barrier properties can be further improved.

In one embodiment of the invention, the MFC suspension is formed by mixing a first suspension comprising microfibrillated cellulose (MFC) having a first size distribution median value (first D50) and a second suspension comprising microfibrillated cellulose having a second size distribution median value (second D50), which second size distribution median value (second D50) is lower than said first size distribution median value (first D50).

The first size distribution median value (D50 value) is preferably between 26-35 µm and said second size distribution median value (D50 value) is preferably between 1-25, preferably between 15-25 µm.

Said MFC suspension is preferably formed by mixing said first and second suspensions in amounts such that said MFC suspension comprises 50-99.9 weight % of MFC from said first suspension and 50-0.1 weight % of MFC from said second suspension, calculated on the total amount of MFC in said MFC suspension. In one embodiment, the MFC suspension to be used to form the web comprises 60-80 weight % of MFC from said first suspension and 40-20 weight % of said second suspension. In this way, the size distribution of the MFC suspension is optimized to achieve a film with a high stretchability and high barrier properties.

The first and second MFC may be provided by mechanical treatment of cellulosic pulp at different total energy input. Said first MFC may be provided by a first process comprising mechanical treatment of cellulosic fibers at a first energy input and said second MFC has been provided by a second process comprising mechanical treatment of cellulosic fibers at a second energy input, wherein said first energy input is less than 50% of said second energy input. In this way, an energy efficient process is provided where the total energy consumption is minimized while a high quality MFC film still can be produced.

The manufacturing of the first and the second MFC may further comprise enzymatic treatment of cellulosic fibers, preferably as a pre-treatment prior to the mechanical treatment. The enzymatic treatment in the first process to provide the first MFC is in this embodiment carried out with lower enzymatic activity and/or at a shorter time than the enzymatic treatment in the second process to provide the second MFC. In this way, also the enzyme consumption can be optimized and still give rise to a high quality MFC film at a later stage. In one embodiment, the enzyme activity in the enzymatic treatment in the first process is 50% higher than the enzyme activity in the enzymatic treatment in the second process.

In one embodiment, the MFC suspension may be provided by:
  providing a fiber suspension comprising cellulose fibers,
  dividing said fiber suspension into a first and a second part,
  fibrillating the first part of said fiber suspension in a first number of mechanical fibrillation steps,
  fibrillating the second part of said fiber suspension in a second number of mechanical fibrillation steps,
  wherein said first number of steps comprises at least one more fibrillation step than said second number of steps.

This provides an efficient method to form an MFC suspension with the desired and optimal size distribution. The first part of the fiber suspension may constitute between 10-40 weight %, preferably 20-30 weight % of the fiber suspension as calculated on the total solid content of said suspension.

The first part of the fiber suspension may be fibrillated in at least a first mechanical fibrillation step and thereafter mixed with the second part of the fiber suspension, which mixture is treated in a second mechanical fibrillation step. In this way, the second mechanical fibrillation step further improves the mixing of the two parts of the suspension. The method may further comprise pretreatment of the fiber suspension in an additional pre-treatment mechanical fibrillation step prior to the step of dividing the fiber suspension into a first and a second part.

The film formed may have a basis weight of less than 40 g/m$^2$, preferably of less than 35 g/m$^2$, an Oxygen Transmission Rate (OTR) value of below 10 ml/m$^2$/per 24 h, preferably below 2 ml/m$^2$/per 24 h, measured by ASTM D-3985 at 50% RH, and a Strain at Break of at least 2%, preferably at least 4%.

The web formed by the MFC suspension is preferably formed by applying the MFC suspension on a substrate, which web is further dried and/or dewatered to form the film. The film of the invention may be formed using both coating technologies, such as cast-coating technologies, where the suspension is applied on a substrate (such as a metal or polymer substrate) and subsequently dried by evaporation, or wet-laid technologies, where the suspension is applied on a porous substrate (such as a paper-making wire) and subsequently dewatered and dried. In one preferred embodiment, the suspension is applied on a substantially non-porous substrate and subsequently dried, preferably by evaporation. The suspension may be applied onto the non-porous substrate by use of any conventional coating techniques known in the art. These include for instance cast coating, roll coating, spray coating, foam coating, printing and screening techniques, blade coating, film press, surface sizing, curtain coating, rotogravure, reverse gravure and kiss coater. The formed web may thereafter be peeled off from the supporting substrate to form a self-standing film. In an alternative embodiment the suspension may be coated onto a substrate (such as a paper or a paperboard), e.g. using any of the above mentioned coating techniques, dried by evaporation and thereafter left on the substrate to form a film coating layer.

The invention is particularly advantageous in connection with coating technologies, such as casting technologies, involving drying by evaporation, since problems with low strain ability in the thus formed films are more frequent. Surprisingly, the invention enables the manufacturing of MFC films with high strain ability and low OTR values using coating technologies, such as cast-coating technologies.

In a second aspect of the invention, there is provided an oxygen barrier film, made from a suspension comprising microfibrillated cellulose with a particle size distribution based on volume exhibiting a D50 value of between 25-35 µm, a D10 value of 10-12 µm and a D90 value of between 100-110 µm.

Said film preferably exhibits a basis weight of less than 40 g/m2, an Oxygen Transmission Rate (OTR) value of below 10 ml/m$^2$/per 24 h at 50% RH and a strain at break value of at least 3,5%, preferably at least 4%.

Preferably, said film is free from long fibers. The film may further be free from additives, such as plasticizers.

In a third aspect, there is provided an oxygen barrier film, made by the method disclosed above, which film exhibits a basis weight of less than 40 g/m2, an Oxygen Transmission Rate (OTR) value of below 10 ml/m$^2$/per 24 h at 50% RH and a strain at break value of at least 3,5%, preferably at least 4%

In a forth aspect, the invention relates to the use of the film in food or liquid packaging applications.

DETAILED DESCRIPTION

Figure 1:
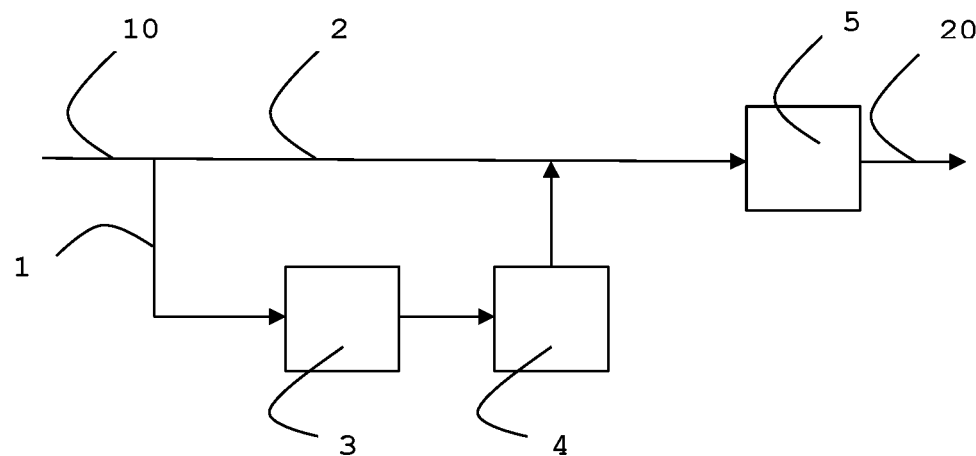
FIG. 1 is a schematic process flow diagram of an embodiment of the present invention.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils,: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides,* Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water.

The cellulose fiber is preferably fibrillated to such an extent that the final specific surface area of the formed MFC is from about 1 to about 300 $m^2/g$, such as from 1 to 200 $m^2/g$ or more preferably 50-200 $m^2/g$ when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CNF) defining a cellolose nanofbire material containing multiple elementary fibrils with both crystalline and amorphous regions, having a high aspect ratio with width of 5-30nm and aspect ratio usually greater than 50.

The oxygen transmission rate (OTR) as used in the patent claims and in the description is measured in accordance with (ASTM D 3985-05), in 24 hours at 23°, 50% RH.

Particle size distribution is defined by determining the D50 (the median), D10 and/or the D90-value.

The median (D50) is defined as the size of the MFC in microns that splits the distribution with half above and half below this value.

The D90 value is defined as the size in microns that splits the distribution so that 90% of the distribution lies below said value.

The D10 value is defined as the size in microns that splits the distribution so that 10% of the distribution lies below said value.

The Particle size distribution including the D50, D10 and D90- values throughout the application are measured by laser diffraction and are thus based on a volume distribution. In this application, these values are measured by use of Mastersizer 3000 (Malvern Instrument Ltd, UK).

Strain at break was determined from stress strain-curves in a universal testing machine (Zwick) with a clamping length of 20 mm, a width of 15 mm and a speed of 2 mm/min.

The term "plasticizers" as used herein is meant additives that increase the plasticity of the film. Plasticizers used in the process of the invention can e.g. be chosen from the group of sugar alcohols such as sorbitol, polyols, such as glycerol, polyethers, such as polyethylene glycol (PEG), cellulose derivatives, such as carboxy methyl cellulose (CMC), or a combination of any of these.

The invention discloses a method of manufacturing an MFC film from an MFC suspension with a broad and optimized size distribution. Preferably, the MFC in the suspension has a particle size distribution based on volume exhibiting a D50 value of between 25-40 µm, preferably of between 25-35 µm, a D10 value of 5-15 µm, preferably of between 10-12 µm and a D90 value of between 90-120 µm, preferably of between 100-110 µm.

Preferably, the MFC suspension to form the web comprises microfibrillated cellulose in an amount of at least 75 weight %, preferably at least 90 weight %, as calculated on the total solid content of said suspension. The MFC suspension may comprise 95 weight % or even 100 weight % of MFC. The remainder may be conventional additives such as e.g. fillers (such as clay), binders, such as PVOH or PVAC, dispersing agents or softeners etc. The consistency of the MFC suspension to be applied onto the substrate is preferably 1-10%, preferably 2-5%.

Said MFC suspension may be formed by mixing of a first and a second microfibrillated cellulose of different particle size distributions. Said first microfibrillated cellulose may have a D50 value of 26-35 µm. It may further have a D10 value of between 10-15 µm and a D90 value of 110-130 µm. Said second microfibrillated cellulose may have a D50 value of 1-25 µm, preferably between 15-25 µm. It may further have a D10 value of between 8-10 µm and a D90 value of 35-80 µm. Aqueous suspensions comprising such MFC are, in accordance with the invention, mixed to form an MFC suspension to be formed to a web.

According to one embodiment, the MFC suspension may be provided by treating a part of a fiber suspension in a first number of mechanical fibrillation steps, and treating a second part of the fiber suspension in a second number of mechanical fibrillation steps, which first number of steps comprise at least one more step than said second number of steps. The first part of the fiber suspension, which has been treated a first number of steps, may form the first suspension and the second part of the fiber suspension, which has been treated a second number of steps, may form the second suspension.

This embodiment is further illustrated in the schematic FIG. 1. In accordance with the embodiment shown in FIG.

1, a fiber suspension (10), comprising e.g. at least 75 weight % cellulose fibers as calculated on the total solid content of said suspension, is divided into a first (1) and a second (2) part. The first part (1) is treated in at least one mechanical fibrillation step (3). In accordance with the embodiment shown FIG. 1, the first part (1) is treated in two mechanical fibrillation steps (3) and (4), but it is apparent to the skilled person that the first part may be treated any number of steps, depending on the mechanical energy input in each step. Said first part is thereafter combined or mixed with the second part of the fiber suspension, which mixture is treated in at least one additional mechanical fibrillation step (5) to form an MFC suspension (20).

Figure 2:
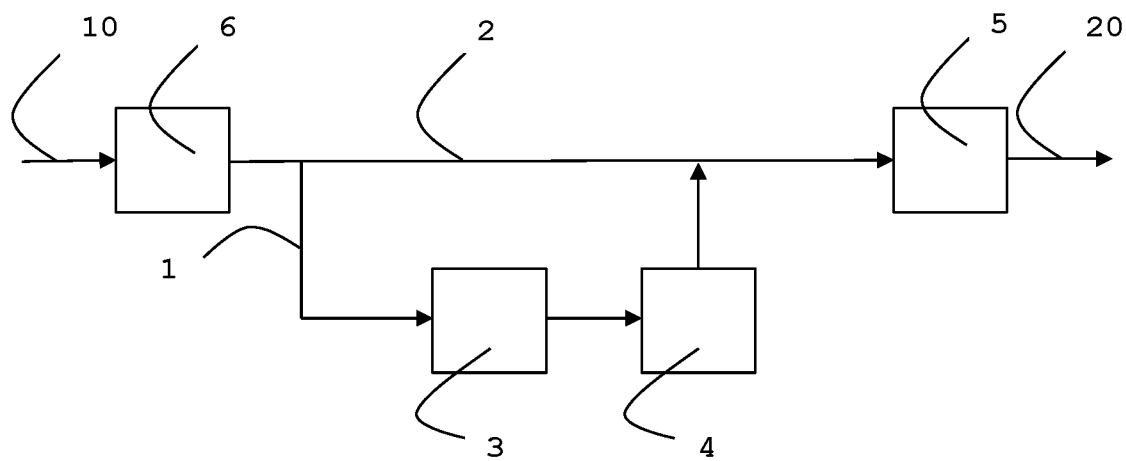
FIG. 2 is a schematic process flow diagram of another embodiment of the present invention.

FIG. 2 shows a slight variation of the embodiment shown in FIG. 1, including the same reference numbers but with the difference that it comprises an additional mechanical fibrillation step (6), wherein the fiber suspension (10) is pre-treated before it is divided into a first and a second part.

The schematic illustrations of the embodiments shown in FIGS. 1 and 2. show the separate steps as separate units, it should however be understood that the different steps can be carried out using one single treatment device.

The MFC suspension may in an alternative embodiment be provided by a continuous fibrillation process in which a fiber suspension is treated in a fibrillation step, and wherein a part of the thus formed MFC is recirculated back to be fibrillated at least a second time.

The mechanical mfibrillation of cellulosic fibers used in the embodiments described above may be carried by use of a refiner, defibrator, beater, friction grinder, high shear fibrillator, disperger, homogenizer (such as a micro fluidizer) and/or other mechanical treatment devices known in the art. Such mechanical treatment is usually carried out at a consistency of between 2-40 wt %, or preferably 15-40 wt %. The MFC is preferably native MFC. Enzymatic treatment of the fibers may further be performed as a pre-treatment before the mechanical treatment or simultaneously with the mechanical treatment. The enzyme used in the treatment can be any wood degrading enzymes which decompose cellulosic fibres, such as cellulose, xylanase and or mannanase.

The MFC film may be formed by use of casting technologies by applying the MFC suspension onto a non-porous web or by use of a paper machine or similar wet laid techniques. After applied onto a substrate, the web is dewatered and/or dried using conventional techniques.

The MFC film formed by the method described has preferably a basis weight of 10-40 g/m2, more preferably of 20-40 g/m2, or 20-30 g/m$^2$. It may further have a thickness of below 50 µm or below 40 µm, preferably in the range of 20-40 µm. According to one embodiment of the invention, the density of the film may be in the range of from 750 kg/m$^3$ to 1550 kg/m$^3$. According to one embodiment the density is higher than 750 kg/m$^3$, according to an alternative the density is higher than 950 kg/m$^3$, and according to yet an alternative embodiment the density is higher than 1050 kg/m$^3$. The film may thus be a so called dense film. The film may further have an Oxygen Transmission Rate (OTR) value of below 10 ml/m$^2$/per 24 h at 50% RH, or below 5 ml/m$^2$/per 24 h at 50% RH and a strain at break value of at least 3,5%, preferably at least 4%

The film as described above is as such useful for packaging foods or liquids.

The film may alternatively be used as an MFC film layer in a multilayer laminate. Thus, the film may be applied onto a fibrous base, such as a paper, paperboard or cardboard made of chemical or (chemi-) mechanical pulp. Preferably the fibrous base is paperboard of a weight of 130 to 300 g/m2, preferably of 200 to 250 g/m2, or paper of a weight of 40 to 130 g/m2. The laminate may further comprise polymer layers, e.g. of polyethylene, or further barrier layers. Such laminates are useful e.g. for is useful e.g. for heat-sealable packages of food or liquids.

EXAMPLE

A first MFC aqueous suspension with a consistency of 3% comprising 100 wt % MFC by total solids was produced with enzymatic and mechanical treatment. Said suspension had measured PSD values: D50 of 34 µm, D10 of 11 µm and D90 of 124µm.

A second MFC aq. suspension with a consistency of 3% comprising 100 wt % by total solids was produced with higher level of enzymatic and mechanical treatment . Said second suspension had measured PSD values: D50 of 22 µm, D10 of 9.6 µm and a D90 of 49 µm.

The first and the second MFC suspension were mixed at a ratio of 3:1 to provide a third MFC aq. suspension. Said third suspension had measured PSD values: D50 of 32 µm, D10 of 11.6 µm and a D90 of 104 µm. This third MFC aq. suspension was mixed using a magnetic stirrer for one hour under vacuum.

| MFC aq. suspension | PSD D10 | PSD D50 | PSD D90 |
| --- | --- | --- | --- |
| 1 | 10.7 | 34.4 | 124 |
| 2 | 9.64 | 21.8 | 49 |
| 3 | 11.6 | 32.2 | 104 |

After mixing the suspension was coated on a heated metal surface using a wire-wound metering rod. The rod was drawn by hand. An 1 mm frame was used as a distance on top of the metal surface to provide a film with thickness of 30-35 µm. The heated metal surface was holding 95° C. at the start of the drying and 80° C. when the suspension had dried to a film.

Films were produced from all three MFC aq. suspensions. All films were tested for mechanical strength seen as stress strain-curves in a universal testing machine (Zwick) with a clamping length of 20 mm, a width of 15 mm and a speed of 2 mm/min. Special attention was taken to the clamps to avoid slippage between the film and the clamps. A mean value from 5 measurements was reported.

The barrier level seen as oxygen barrier was measured according to ASTM D-3985 at a relative humidity of 50% at 23° C. The best of 2 samples was reported. The samples were masked to 5 cm$^2$ before measurement.

| MFC aq. suspension | Tensile stress, MPa | Strain at break, % | Thickness, µm | OTR, 23° C., 50% RH |
| --- | --- | --- | --- | --- |
| 1 | 11695 | 2.6 | 31 | 1.4 |
| 2 | 6830 | 1.5 | 36 | 1.3-2.2 (several measurements) |
| 3 | 7870 | 3.4 | 30 | 2.2 |

In view of the above detailed description of the present invention, other modifications and variations will become apparent to those skilled in the art. However, it should be apparent that such other modifications and variations may be effected without departing from the spirit and scope of the invention.

The invention claimed is:

1. A method of manufacturing an oxygen barrier film comprising:

providing an MFC suspension comprising at least 75 weight % microfibrillated cellulose (MFC), as calculated on the total solid content of said suspension, which MFC has a particle size distribution based on volume exhibiting a D50 value of between 25-40 µm, a D10 value of 5-15 µm and a D90 value of between 90-120 µm, wherein the MFC suspension has been formed by mixing a first suspension comprising MFC having a D50 value of between 26-35 µm and a suspension comprising MFC having a D50 value of between 1-25 µm, wherein the MFC suspension comprises 60-80 weight % of MFC from said first suspension and 40-20 weight % of MFC from said second suspension, forming a web of said MFC suspension, dewatering and/or drying said web to form a film.

2. The method according to claim 1, wherein said MFC suspension is free from long fibers.

3. The method according to claim 1, wherein said first suspension has been provided by a first process comprising mechanical treatment of cellulosic fibers at a first energy input and said second suspension has been provided by a second process comprising mechanical treatment of cellulosic fibers at a second energy input, wherein said first energy input is less than 50% of said second energy input.

4. The method according to claim 1, wherein said first suspension has been provided by a first process and said second suspension has been provided by a second process, wherein the first and second processes comprise enzymatic treatment of cellulosic fibers and wherein the enzymatic treatment in the first process to provide the first suspension is carried out with lower enzymatic activity and/or at a shorter time than the enzymatic treatment in the second process to provide the second suspension.

5. The method according to claim 1, wherein said MFC suspension is formed by providing a fiber suspension comprising cellulose fibers, dividing said fiber suspension into a first part and a second part, fibrillating the first part of said fiber suspension in a first number of mechanical fibrillation steps to provide the first suspension comrising MFC, fibrillating the second part of said fiber suspension in a second number of mechanical fibrillation steps to provide the second suspension comprising MFC, wherein said first number of steps comprises at least one more fibrillation step than said second number of steps.

6. The method according to claim 5, wherein the first part of the fiber suspension constitutes between 10-40 weight % of the fiber suspension as calculated on the total solid content of said suspension.

7. The method according to claim 5, wherein the first part of the fiber suspension is fibrillated in at least a first mechanical fibrillation step and thereafter mixed with the second part of the fiber suspension, which mixture is treated in a second mechanical fibrillation step.

8. The method according to claim 5, which method comprises pretreatment of the fiber suspension in an additional pre-treatment mechanical fibrillation step prior to the step of dividing the fiber suspension into a first and a second part.

9. The method according to claim 5, wherein the first part of the fiber suspension constitutes between 20-30 weight % of the fiber suspension as calculated on the total solid content of said suspension.

10. The method according to claim 1, wherein the film formed has a basis weight of less than 40 g/m$^2$, an Oxygen Transmission Rate (OTR) value of below 10 ml/m$^2$/per 24 h, measured by ASTM D-3985 at 50% RH, and a Strain at Break of at least 2%.

11. The method according to claim 1, wherein the web is formed by applying the suspension on a substrate, which web is further dried and/or dewatered to form the film.

12. The method according to claim 11, wherein the web is formed by applying the suspension on a non-porous substrate, which web is further dried to form the film.

13. The method according to claim 1, wherein the film formed has a basis weight of less than 35 g/m$^2$, an Oxygen Transmission Rate (OTR) value of below 2 ml/m$^2$/per 24 h, measured by ASTM D-3985 at 50% RH, and a Strain at Break of at least 4%.

* * * * *